US008760765B2

(12) United States Patent
Gupta

(10) Patent No.: US 8,760,765 B2
(45) Date of Patent: Jun. 24, 2014

(54) OPTICAL BEAM TILT FOR OFFSET HEAD MOUNTED DISPLAY

(75) Inventor: Anurag Gupta, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 13/423,672

(22) Filed: Mar. 19, 2012

(65) Prior Publication Data

US 2013/0242405 A1  Sep. 19, 2013

(51) Int. Cl.
*G02B 27/14* (2006.01)
*G09G 5/00* (2006.01)
*G02B 27/01* (2006.01)

(52) U.S. Cl.
CPC .................................. *G02B 27/0172* (2013.01)
USPC ............................................... 359/630; 345/8

(58) Field of Classification Search
CPC ............. G02B 27/017; G02B 27/0172; G02B 27/0179
USPC .................................... 359/630–632; 345/7–9
See application file for complete search history.

(56) References Cited

U.S. PATENT DOCUMENTS

| 4,711,512 | A | 12/1987 | Upatnieks |
|---|---|---|---|
| 5,076,664 | A | 12/1991 | Migozzi |
| 5,093,567 | A | 3/1992 | Staveley |
| 5,539,422 | A | 7/1996 | Heacock et al. |
| 5,696,521 | A | 12/1997 | Robinson et al. |
| 5,715,337 | A | 2/1998 | Spitzer et al. |
| 5,771,124 | A | 6/1998 | Kintz et al. |
| 5,815,126 | A | 9/1998 | Fan et al. |
| 5,844,530 | A | 12/1998 | Tosaki |
| 5,886,822 | A | 3/1999 | Spitzer |
| 5,896,232 | A | 4/1999 | Budd et al. |
| 5,926,318 | A | 7/1999 | Hebert |
| 5,943,171 | A | 8/1999 | Budd et al. |
| 5,949,583 | A | 9/1999 | Rallison et al. |
| 6,023,372 | A | 2/2000 | Spitzer et al. |

(Continued)

FOREIGN PATENT DOCUMENTS

| EP | 1 300 716 A1 | 4/2003 |
|---|---|---|
| GB | 2272980 A | 6/1994 |

(Continued)

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Alicia M Harrington
(74) *Attorney, Agent, or Firm* — Blakely Sokoloff Taylor & Zafman LLP

(57) ABSTRACT

An eyepiece for a head mounted display includes a display module, end reflector, and viewing region. The end reflector is disposed at an opposite end of the eyepiece from the display module to reflect the display light back from a forward propagation path to a reverse propagation path. The viewing region is disposed between the display module and the end reflector and includes a partially reflective surface, that passes the display light traveling along the forward propagation path and redirects the display light traveling along the reverse propagation path out of an eye-ward side of the eyepiece along an emission path. The partially reflective surface has a compound folding angle such that the emission path of the display light emitted from the eyepiece is folded along two axes relative to the reverse propagation path between the end reflector and the partially reflective surface.

21 Claims, 6 Drawing Sheets

(56) References Cited

U.S. PATENT DOCUMENTS

| | | |
|---|---|---|
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,671,100 B1 | 12/2003 | McRuer |
| 6,690,516 B2 | 2/2004 | Aritake et al. |
| 6,701,038 B2 | 3/2004 | Rensing et al. |
| 6,724,354 B1 | 4/2004 | Spitzer |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitai |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0213664 A1 | 9/2011 | Osterhout et al. |

FOREIGN PATENT DOCUMENTS

| | | |
|---|---|---|
| JP | 10-253919 A | 9/1998 |
| JP | 2000-214409 A | 8/2000 |
| JP | 2002-014300 A | 1/2002 |
| WO | WO 96/05533 A1 | 2/1996 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

PCT/US2013/029668; PCT International Search Report and Written Opinion of the International Searching Authority, mailed Jun. 4, 2013, 7 pages.

OPTICAL BEAM TILT FOR OFFSET HEAD MOUNTED DISPLAY

TECHNICAL FIELD

This disclosure relates generally to the field of optics, and in particular but not exclusively, relates to head mounted displays.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI") while blocking the user's external view. These HMD displays are often referred to as virtual reality ("VR") displays. Other HMDs are capable of superimposing CGI over a real-world view. This latter type of HMD can serve as the hardware platform for realizing augmented reality ("AR"). With AR the viewer's image of the world is augmented with an overlaying CGI. Another term used to refer to various types of HMDs is a heads-up display ("HUD"). A HUD is any display that permits the user to view a CGI without having to look down or otherwise taking their eyes significantly off their head up forward position. Both VR and AR HMDs can be implemented as HUDs.

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, limited field of view, small eyebox, or poor efficiency of conventional optical systems used to implemented existing HMDs. In particular, conventional HMDs often restrict the users view of the external world, making them awkward to wear during regular daily activities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system, and method of operation of an eyepiece for a head mounted display ("HMD") that outputs computer generated image ("CGI") light along a tilted emission path are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
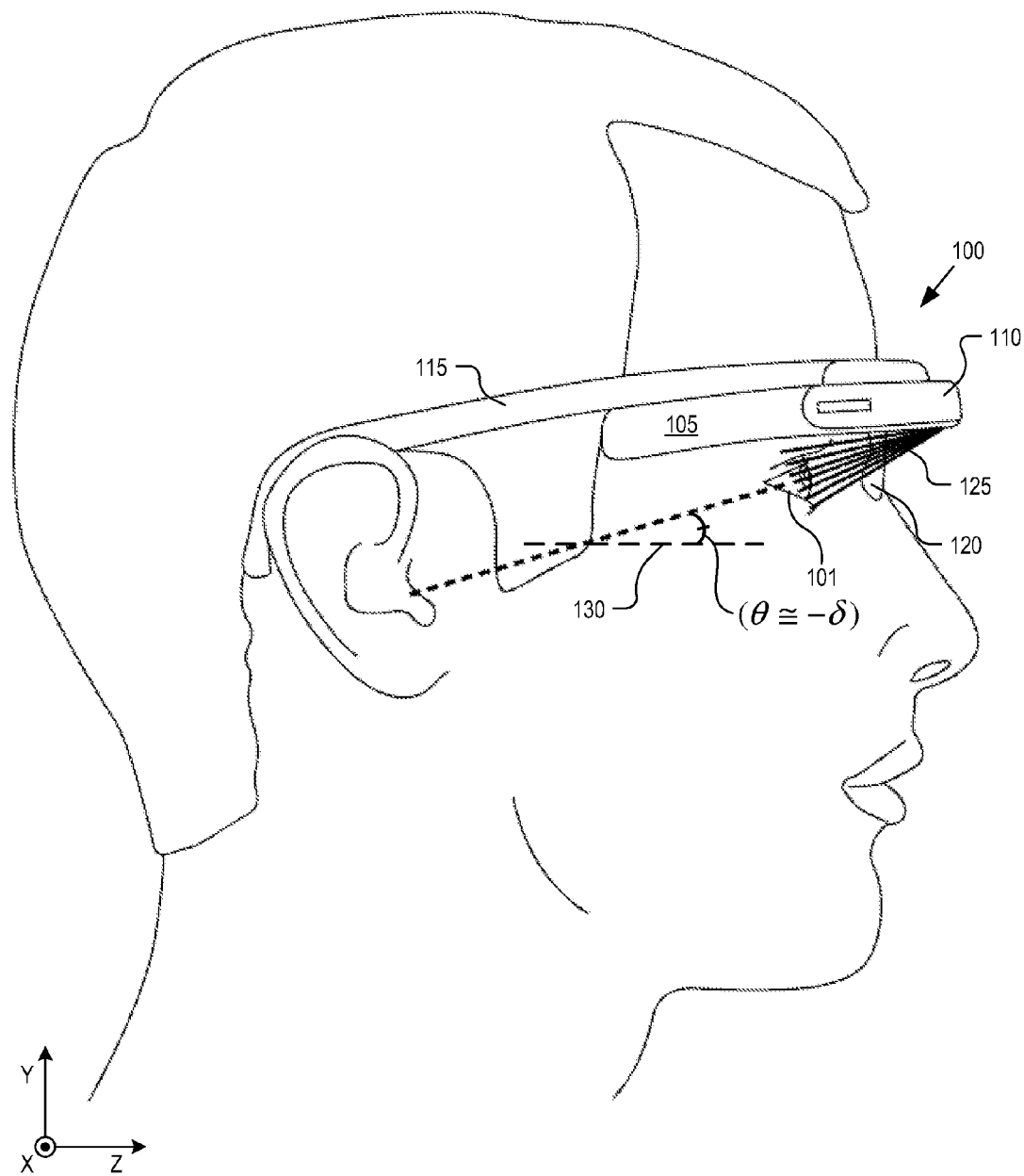
FIG. 1 illustrates a head mounted display ("HMD") for wearing offset from a user's eyes, in accordance with an embodiment of the disclosure.

FIG. 1 illustrates a head mounted display ("HMD") 100 for wearing offset from a user's eye(s) 101, in accordance with an embodiment of the disclosure. The illustrated embodiment of HMD 100 includes an electronics housing 105 and eyepiece 110 supported on the head of the user by a frame assembly. The illustrated frame assembly includes a right ear arm 115, left ear arm (not illustrated), and a nose bridge 120. HMD 100 may be implemented as a monocular embodiment that includes a single eyepiece 110 for displaying CGI light 125 to a single eye 101 (illustrated) or a binocular embodiment that includes dual eyepieces 110 for displaying CGI light to both eyes (not illustrated).

Electronics housing 105 and eyepiece 110 are secured into an eyeglass arrangement that can be worn on the head of a user either above (illustrated) or below (not illustrated) the users eyes 101. The left and right ear arms rest over the user's ears while nose bridge 120 rests over the user's nose. The frame assembly is shaped and sized to position an eyepiece 110 in a near-to-eye configuration above (or below) the user's central forward vision. Of course, other frame assemblies having other shapes may be used (e.g., a visor with ear arms and a nose bridge support, a single contiguous headset member, a headband, goggles type eyewear, etc.). By positioning eyepiece 110 above the user's eyes, HMD 100 does not constrain the lateral field of view ("FOV") of the user's forward vision. Eyepiece 110 is designed to emit CGI light 125 along an emission path that is tilted down towards the user's eye 101. The tilted emission path is achieved using an partially reflective surface having a compound folding angle housed internal to eyepiece 110. Thus, the external side surfaces of eyepiece 110 can maintain a vertical or near vertical position, thus improving the industrial design of HMD 100 and maintaining a pleasing aesthetics. To view CGI light 125, the user need only tilt their gaze upward by a gazing angle θ above horizontal 130 (or downward in the cases of eyepiece 110 suspended below the eye) to align with the downward tilt angle δ of CGI light 125 emitted from eyepiece 110. In one embodiment, the frame assembly is designed to hold eyepiece 110 relative to eye 101, such that tilt angle δ=−7 degree±3 degrees will centrally position the image on eye 101 when the user lifts their gazing angle θ by a corresponding angle. In other words, to view CGI light 125, θ≅−δ.

The illustrated embodiment of HMD 100 is capable of displaying an CGI to the user in the form of a heads up display ("HUD") without undue obstruction of their forward vision. In one embodiment, the viewing region of eyepiece 110 is partially transparent, which further permits the user to see the external real world even through eyepiece 110 even when they look up. When looking up, the CGI light 125 may be seen by the user as virtual images superimposed over the real world as an augmented reality. In some embodiments, eyepiece 110 may be opaque and block their upward external vision. Electronics housing 105 may house various electronic components for operation of HMD 100 such as a power supply, a graphics engine, a microprocessor, input/output circuitry, a wireless transceiver, memory, etc.

Figure 2A:
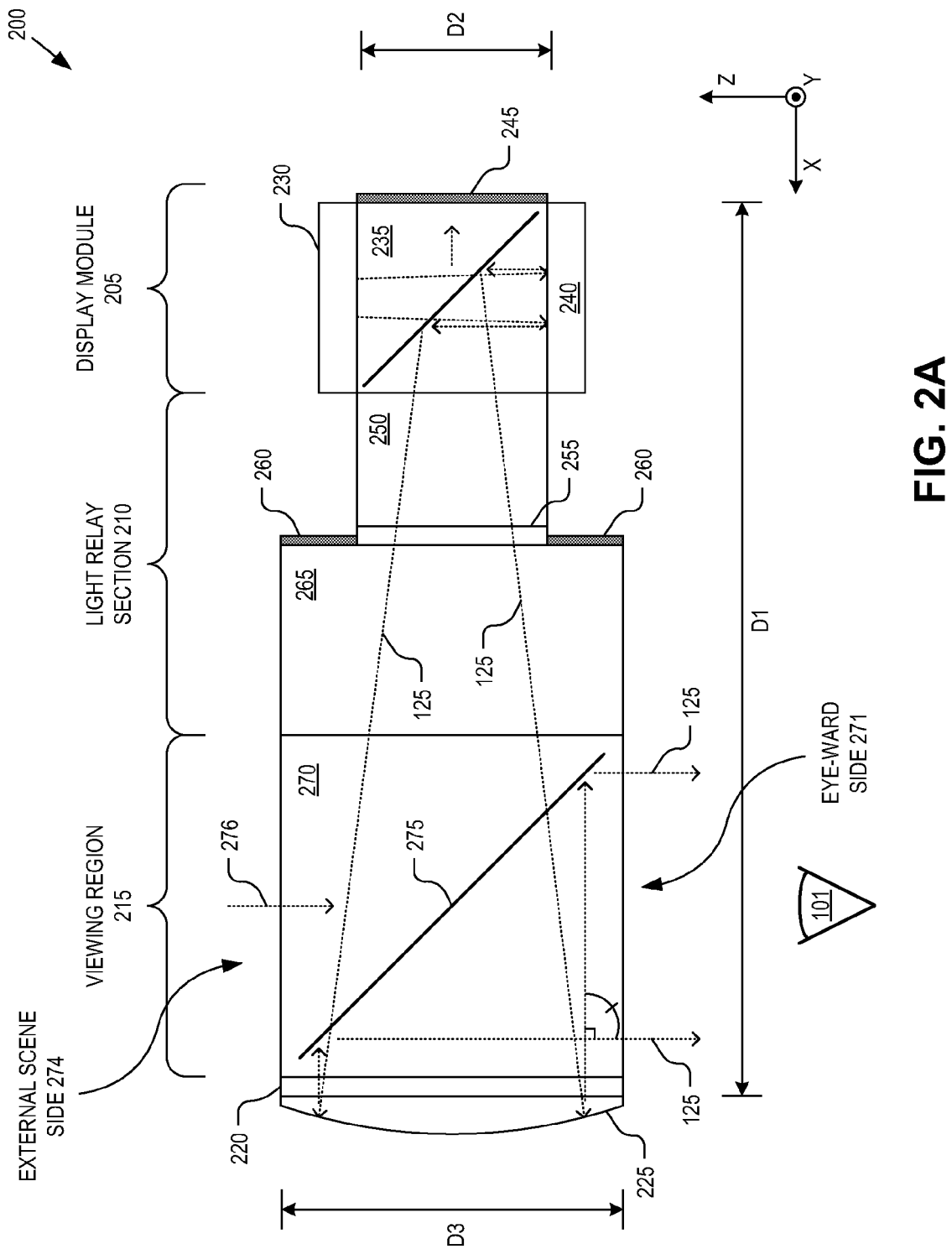
FIGS. 2A-C illustrate various side views of an eyepiece for an HMD that outputs computer generated image ("CGI") light along a tilted emission path, in accordance with an embodiment of the disclosure.
Figure 2B:
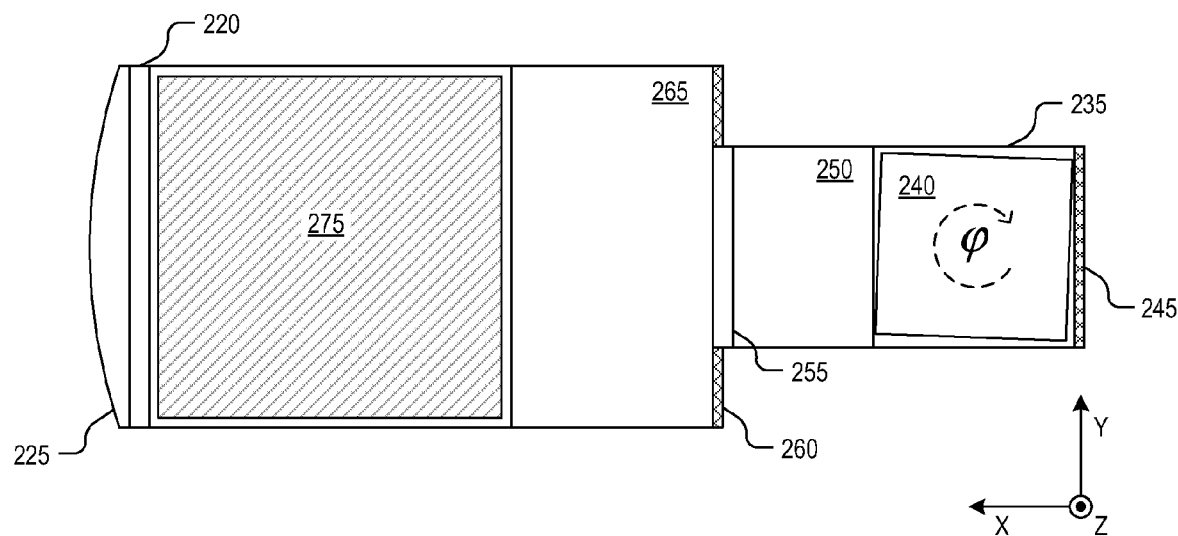
Figure 2C:
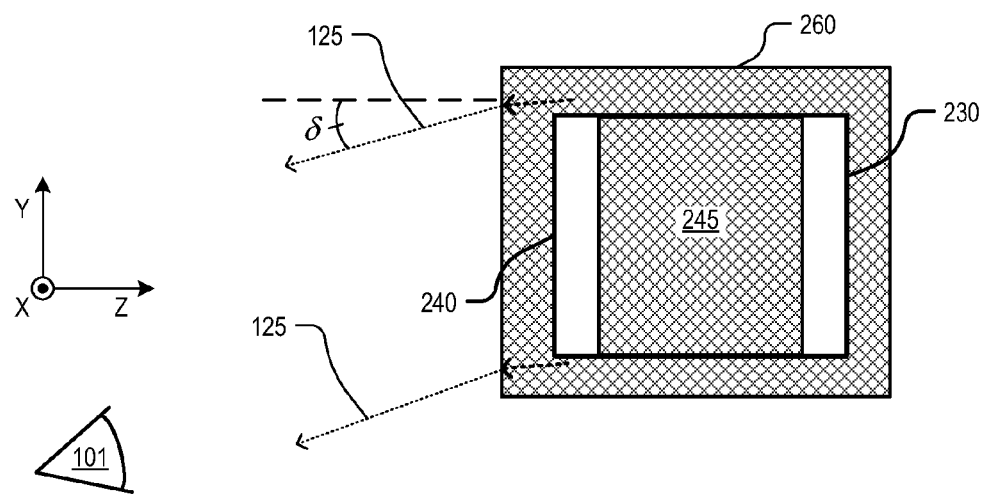

FIGS. 2A-C illustrate various side views of an eyepiece 200 that outputs CGI light 125 along a tilted emission path, in accordance with an embodiment of the disclosure. Eyepiece 200 is one possible implementation of eyepiece 110 illustrated in FIG. 1. The illustrated embodiment of eyepiece 200 includes a display module 205, a light relay section 210, a viewing region 215, a quarter-wave plate rotator 220, and an end reflector 225. The illustrated embodiment of display module 205 includes a lamp source 230, an in-coupling beam splitter 235, a display panel 240, and a light absorbing coating 245. The illustrated embodiment of light relay section 210 includes small section 250, a half-wave plate polarization rotator 255, light blocks 260, and large section 265. The illustrated embodiment of viewing region 215 is a see-through region with an out-coupling beam splitter 270 having a partially reflective surface 275. Viewing region 215 includes an eye-ward side 271 for emission of CGI light 125 towards eye 101 and an external scene side 274 through which, in some embodiments, ambient light 276 may pass.

Figure 3:
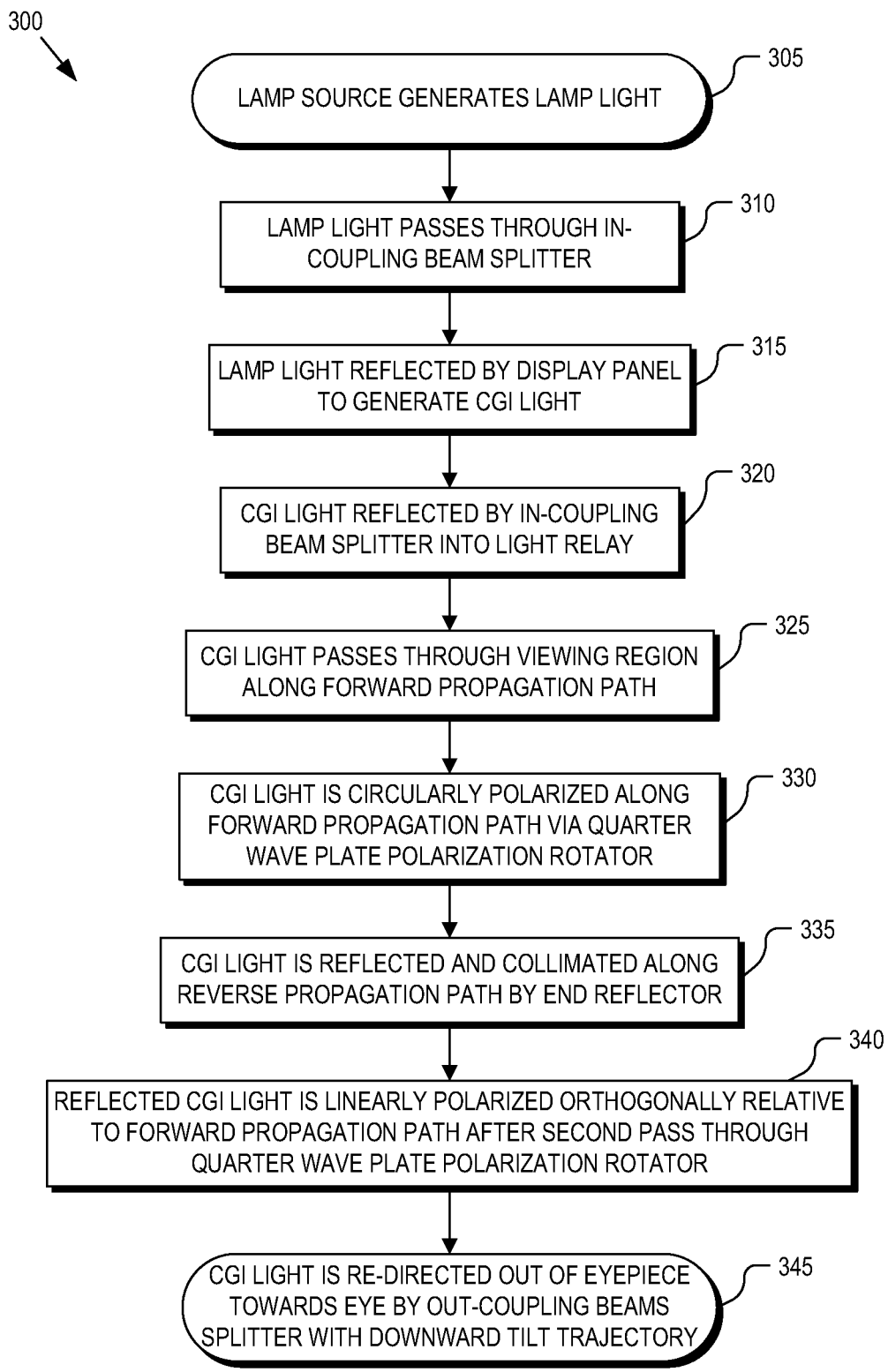
FIG. 3 is a flow chart illustrating a process of operation of an eyepiece that outputs CGI light along a tilted emission path, in accordance with an embodiment of the disclosure.

FIG. 3 is a flow chart illustrating a process 300 of operation of eyepiece 200, in accordance with an embodiment of the disclosure. Process 300 is described with reference to FIGS. 2A-C. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, lamp source 230 generates lamp light used to illuminate display panel 240, which modules image data onto the lamp light to create CGI light 125. At least a portion of the lamp light passes through in-coupling beam splitter 235 to illuminate display panel 240 (process block 310). In one embodiment, in-coupling beam splitter 235 is a polarizing beam splitter ("PBS") cube that substantially passes light of a first polarization (e.g., P polarization), while substantially reflecting light of a second polarization (e.g., S polarization). These two polarization components are typically orthogonal linear polarizations. The emitted light may be pre-polarized (e.g., P polarized) or unpolarized light. In either event, the P polarization component passes through in-coupling beam splitter 235 to illuminate display panel 240 while most of any remaining portions of S polarization are reflected back onto light absorbing coating 245 (e.g., flat black paint). Thus, in the illustrated embodiment, display panel 240 is mounted in opposition to lamp source 230 with in-coupling beam splitter 235 disposed in between. In other embodiments (not illustrated), display panel 240 and light absorbing coating 245 can swap locations.

Display panel 240 (e.g., liquid crystal on silicon panel, digital micro-mirror display, etc.) imparts image data onto the lamp light via selective reflection by an array of reflective pixels (process block 315). In an embodiment using an LCOS panel, reflection by display panel 240 rotates the polarization of the incident lamp light by 90 degrees. Upon reflection of the incident lamp light, CGI light 125 (which has been rotated in polarization by 90 degrees to be, for example, S polarized) is re-directed by in-coupling beam splitter 235 and propagates down light relay section 210 along a forward propagation path towards viewing region 215 (process block 320). In an embodiment using a digital micro-mirror display, in-coupling beam splitter 235 may be implemented as a standard 50/50 non-polarizing beam splitter and the CGI light 125 may be unpolarized light.

In the illustrated embodiment, CGI light 125 is directed along the forward propagation path within light relay section 210 without need of total internal reflection ("TIR"). In other words, the cross sectional shape and divergence of the light cone formed by CGI light 125 is confined such that the light rays reach end reflector 225 without need of TIR off the sides of light relay section 210.

In-coupling beam splitter 235, light relay section 210, and out-coupling beam splitter 270 may be fabricated of a number of materials including glass, optical grade plastic, fused silica, PMMA, Zeonex-E48R, or otherwise. The length of light relay section 210 may be selected based upon the temple-eye separation of the average adult and such that the focal plane of end reflector 225 substantially coincides with an emission aperture of display panel 240. To achieve focal plane alignment with the emission aperture of display panel 240, both the length of light relay section 210 and the radius of curvature of end reflector 225 may be selected in connection with each other.

In the illustrated embodiment, light relay section 210 includes half-wave plate polarization rotator 255 disposed at the interface between small section 250 and large section 265. Half-wave plate polarization rotator 255 servers to rotate the polarization of CGI light 125 by 90 degrees (e.g., convert the S polarized light back to P polarized light again). The illustrated embodiment of light relay section 210 further includes light blocks 260 disposed on the edges of large section 265 that extend past small section 250. Light blocks 260 reduce external light from leaking into light relay section 210. Light blocks 260 may be opaque paint, a opaque collar extending around small section 250, or otherwise. In other embodiments, light relay section 210 may not include a small section 250, rather the entire length of light relay section 210 may have a continuous sloped cross-section or a constant size cross-section.

In the illustrated embodiment, out-coupling beam splitter 270 is an out-coupling PBS cube configured to pass one linear polarization (e.g., P polarization), while reflecting the other linear polarization (e.g., S polarization). Thus, the out-coupling PBS passes CGI light 125 propagating along the forward propagation path through viewing region 215 to quarter wave-plate polarization rotator 220.

In a process block 330, CGI light 125 then passes through quarter-wave plate polarization rotator 220 along the forward propagation path. In so doing, the polarization of the CGI light is circularly polarized.

In a process block 335, CGI light 125 is reflected back along the reverse propagation path by end reflector 225. In one embodiment, end reflector 225 is a concave reflector and has a shape to substantially collimate CGI light 125 reflected along the reverse propagation path. Collimating the CGI light has an effect of virtually displacing the CGI image at or near infinity thereby helping the human eye 101 to bring the CGI image into focus in a near-to-eye configuration. Of course, end reflector 225 may reduce the divergence without fully collimating the light, thereby displacing the virtual image at a location less than infinity (e.g., 1 to 3 meters).

In a process block 340, the reflected CGI light traveling along the reverse propagation path once again passes through quarter-wave plate polarization rotator 220, causing the reversed circularly polarized CGI light to be linearly polarized at an orthogonal direction of polarization to the forward propagation path. Thus, after passing through polarization rotator 220 for the second time, CGI light 125 has a polarization that is substantially reflected by out-coupling beam splitter 270 (e.g., S polarization). In a process block 345, the CGI light is reflected by out-coupling PBS 215 and redirected out of eyepiece 200 through eye-ward side 271 towards eye 101.

Partially reflective surface 275 has a compound folding angle that not only redirects CGI light 125 along an emission path that is substantially normal to both the reverse propagation path and the eye-ward side 271 of viewing region 215 but also tilts downward at tilt angle δ to reach eye 101 located below eyepiece 200. However, the compound folding angle of partially reflective surface 275 results in image rotation to CGI light 125 due to tilt angle δ. Referring to FIGS. 2B and 2C, this image rotation is pre-compensated by rotating display panel 240 in a complementary direction by a rotation angle φ. The magnitude of φ is less than the magnitude of tilt angle δ due to the refractive bending of the emission path as CGI light 125 exits eyepiece 101 (see FIG. 2C). For example, to achieve a 7 degree tilt angle δ, display panel 240 may be rotated in a complementary direction by rotation angle φ of 4.55 degrees.

Figure 4A:
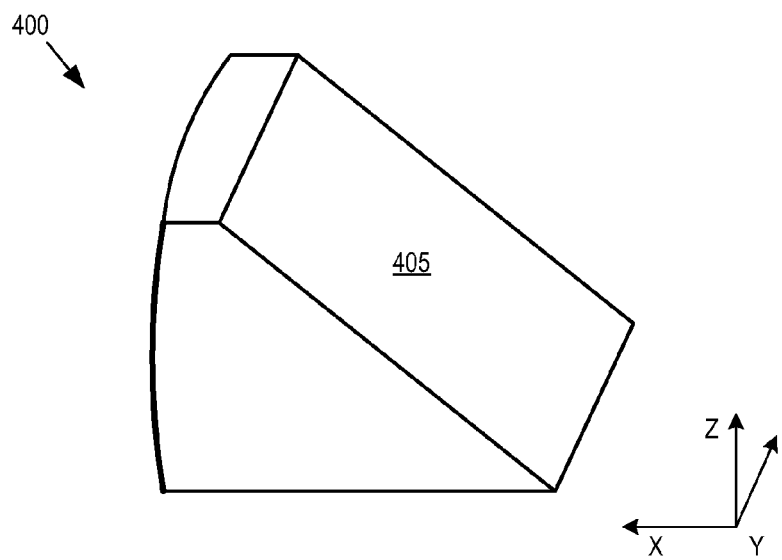
FIGS. 4A-C illustrate various views of a partially reflective surface having a compound folding angle for reflecting CGI light out of an eyepiece of a HMD along a tilted emission path, in accordance with an embodiment of the disclosure.
Figure 4B:
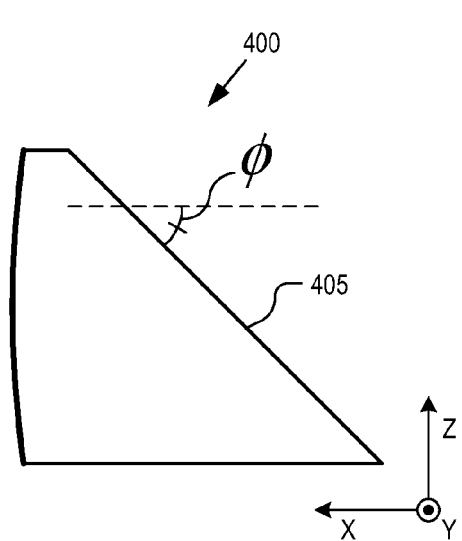
Figure 4C:
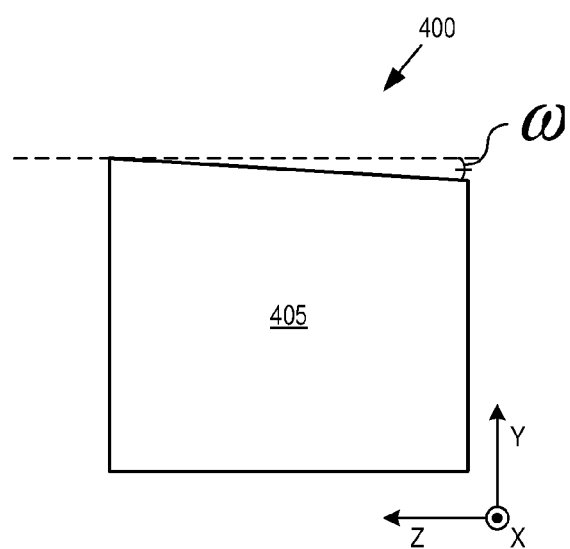

FIGS. 4A-C illustrate various views of an out-coupling beam splitter 400, in accordance with an embodiment of the disclosure. Out-coupling beam splitter 400 is one possible implementation of out-coupling beam splitter 270. The illustrated embodiment of out-coupling beam splitter 400 includes a partially reflective surface 405 having a compound folding angle. Partially reflective surface 405 may be implemented as a non-polarizing beam splitter (e.g., 50/50 beam splitter), such as a thin layer of silver, or a polarizing beam splitter, such as a multi-layer thin film structure.

The compound folding angle causes partially reflective surface 405 to slope along two independent axis with each axis having an independent folding angle. The first folding angle is responsible for redirecting the emission path of CGI light 125 to be approximately normal to eye-ward side 271 and normal to the reverse propagation path. The second folding angle ω is responsible for generating the downward tilt of the emission path. It is noteworthy that the second folding angle ω is substantially equal in magnitude though complementary in direction to rotation angle φ (see FIG. 2B) for rotating display panel 240. While a folding angle would typically be 45 degrees to achieve a normal emission path, due to the compound folding angles applied to partially reflective surface 405, a folding angle of approximately 44.82 degrees achieves a normal emission path. Similarly, a second folding angle ω of 7 degrees may be expected to achieve a tilted emission path of 7 degrees; however, due to the compound folding angles and the refraction of CGI light 125 as it exits eyepiece 200, a second folding angle ω of approximately 4.55 degrees achieves the 7 degree tilted emission path (e.g., tilt angle δ illustrated in FIG. 2C).

Figure 5A:
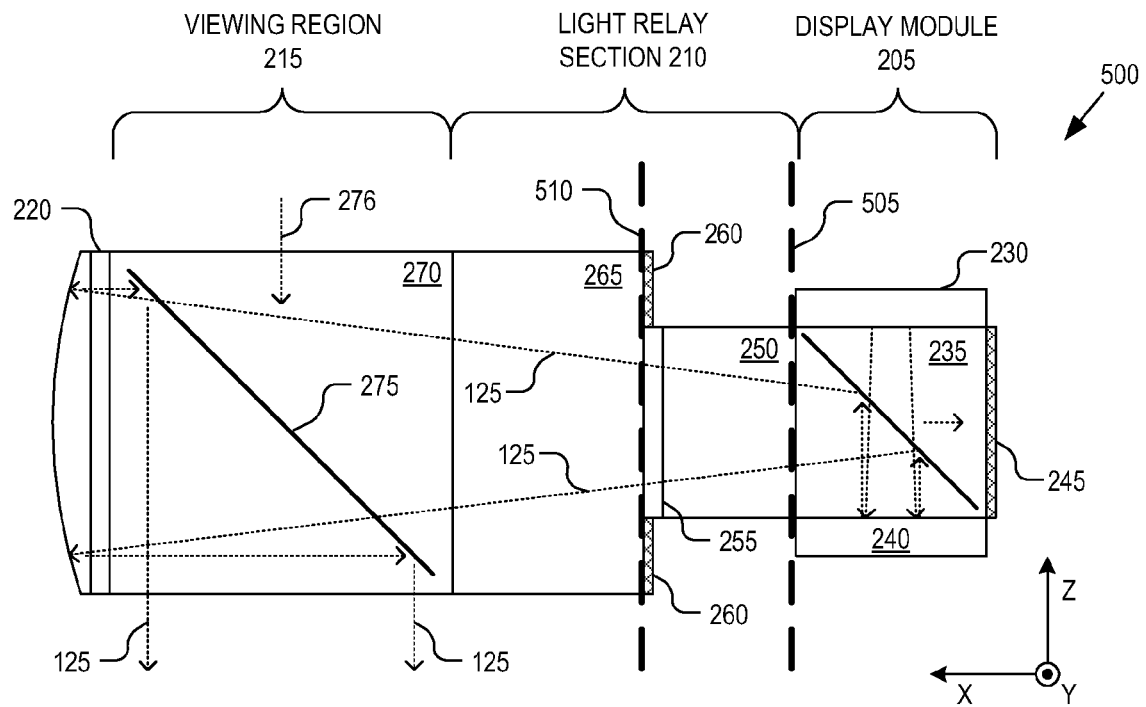
FIGS. 5A & B illustrate views of an eyepiece for an HMD that outputs CGI light along a tilted emission path, in accordance with an embodiment of the disclosure.
Figure 5B:
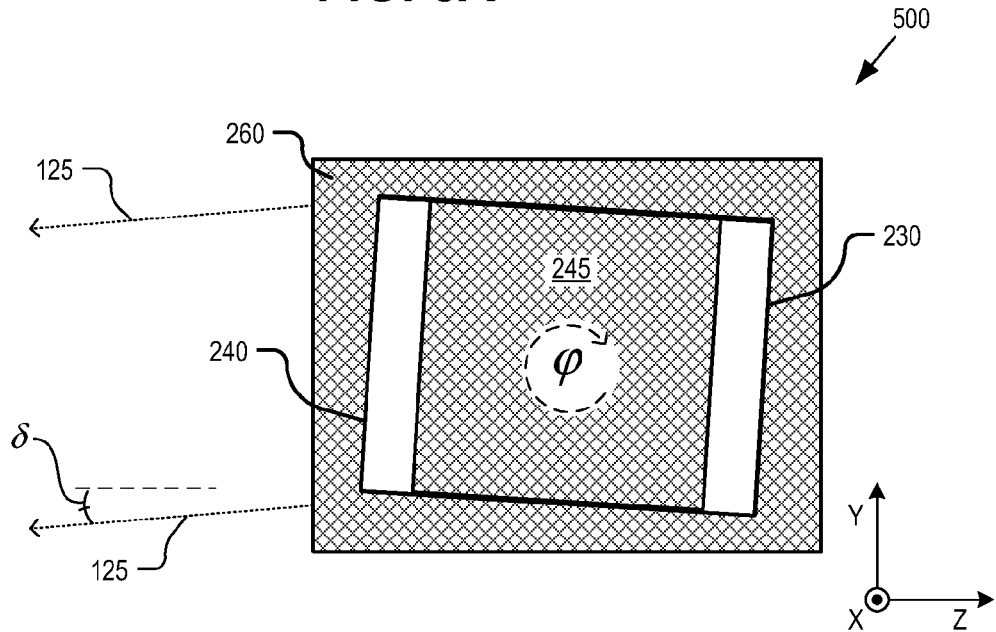

FIGS. 5A & B illustrate views of an eyepiece 500, in accordance with an embodiment of the disclosure. Eyepiece 500 is another possible implementation of eyepiece 110 illustrated in FIG. 1. Eyepiece 500 is similar to eyepiece 200, except that the pre-compensation for image rotation due to folding angle ω is implemented by rotating the entire display module 205 along line 505 or along line 510 instead of rotating display panel 240 as illustrated in FIG. 2B.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head mounted display, the eyepiece comprising:
   a display module for providing display light along a forward propagation path within the eyepiece;
   an end reflector disposed at an opposite end of the eyepiece from the display module to reflect the display light back along a reverse propagation path within the eyepiece; and
   a viewing region to be aligned with an eye of a user, the viewing region disposed between the display module and the end reflector and including a partially reflective surface, the partially reflective surface to pass the display light traveling along the forward propagation path and to redirect the display light traveling along the reverse propagation path out of an eye-ward side of the eyepiece along an emission path,
   wherein the partially reflective surface has a compound folding angle such that the emission path of the display light emitted from the eyepiece is folded along two axes relative to the reverse propagation path between the end reflector and the partially reflective surface.

2. The eyepiece of claim 1, wherein the compound folding angle comprises:
   a first folding angle for redirecting the display light from a first axis running substantially parallel with the eye-ward side of the eyepiece to a second axis running substantially perpendicular to the eye-ward side; and
   a second folding angle for redirecting the display light at an oblique angle to the eye-ward side of the eyepiece.

3. The eyepiece of claim 2, wherein the display light is rotated in a complementary direction to pre-compensate for image rotation introduced by the second folding angle prior to passing through the partially reflective surface along the forward propagation path.

4. The eyepiece of claim 3, wherein the display module comprises:
   a lamp source to generate lamp light;
   a display panel positioned to be illuminated by the lamp light and to selectively reflect the lamp light as the display light; and
   an in-coupling beam splitter disposed between the lamp source and the display panel to redirect the display light received from the display panel along the forward propagation path within the eyepiece.

5. The eyepiece of claim 4, wherein the display panel is mounted to a surface of the eyepiece that is substantially parallel to the eye-ward side of the viewing region out which the display light is emitted from the eyepiece and wherein the display panel is rotated about a rotation axis normal to the surface.

6. The eyepiece of claim 3, wherein the display module is rotated in the complementary direction about an axis running down a center of the forward propagation path extending from the display module to the end reflector to pre-compensate for the image rotation introduced by the second folding angle.

7. The eyepiece of claim 2, wherein the first folding angle is 44.82 degrees±3 degrees and the second folding angle is 4.55 degrees±3 degrees.

8. The eyepiece of claim 3, wherein the rotation of the display image is equal in magnitude but complementary in direction to the second folding angle.

9. The eyepiece of claim 1, further comprising:
a light relay coupled between the viewing region and the display module through which the forward propagation path extends;
a half-wave plate polarization rotator disposed within the forward propagation path between the display module and the partially reflective surface; and
a quarter-wave plate polarization rotator disposed between the end reflector and the partially reflective surface within the forward and reverse propagation paths.

10. The eyepiece of claim 9, wherein the partially reflective surface comprises a polarizing beam splitter within an oblique surface having the compound folding angle.

11. A method of operation of a head mounted display ("HMD"), the method comprising:
passing display light traveling along a forward propagating path within an eyepiece of the HMD through a partially reflective surface;
reflecting, with an end reflector, the display light from the forward propagating path to a reverse propagating path extending within the eyepiece; and
reflecting, with the partially reflective surface, the display light travelling along the reverse propagating path out of the eyepiece along an emission path into an eye of a user wearing the HMD, wherein the emission path exits the eyepiece through an eye-ward surface of the eyepiece,
wherein the eyepiece is positioned above the eye with the eye-ward side of the eyepiece being substantially vertical,
wherein the partially reflective surface has a compound folding angle such that the emission path of the display light emitted from the eyepiece is substantially perpendicular to the eye-ward surface along a first axis and tilted downward towards the eye along a second axis.

12. The method of claim 11, wherein the display light is viewable by the user when the user tilts their gaze upward by approximately 7 degrees±3 degrees.

13. The method of claim 11, further comprising:
rotating the display light traveling along the forward propagating path prior to passing through the partially reflective surface about a rotation axis by a complementary angle to pre-compensate for image rotation introduced by the downward tilt of the compound folding angle.

14. The method of claim 13, wherein rotating the display light traveling along the forward propagating path about the rotation axis comprises rotating a display panel that generate the display light by the complementary angle, wherein the rotation axis is substantially normal to the eye-ward side of the eyepiece through which the display light is emitted.

15. The method of claim 13, wherein rotating the display light traveling along the forward propagating path about the rotation axis comprises rotating a display module for generating the display light about the rotation axis, wherein the rotation axis runs along the forward propagating path extending from the display module to the end reflector.

16. A head mounted display ("HMD") for providing display light to an eye of a user, the HMD comprising:
an eyepiece including:
an display module for providing the display light along a forward propagation path within the eyepiece;
an end reflector disposed at an opposite end of the eyepiece from the display module to reflect the display light back along a reverse propagation path within the eyepiece; and
a viewing region to be aligned with an eye of a user, the viewing region disposed between the display module and the end reflector and including a partially reflective surface, the partially reflective surface to pass the display light traveling along the forward propagation path and to redirect the display light traveling along the reverse propagation path out of an eye-ward side of the eyepiece along an emission path,
wherein the partially reflective surface has a compound folding angle such that the emission path of the display light emitted from the eyepiece is folded along two axes relative to the reverse propagation path between the end reflector and the partially reflective surface, and
a frame assembly to support the eyepiece for wearing on a head of the user with the viewing region positioned above the eye of the user.

17. The HMD of claim 16, wherein the frame assembly supports the eyepiece such that the emission path of the display light passes through an eye-ward side of the viewing region that is held substantially vertical when the HMD is worn.

18. The HMD of claim 16, wherein the compound folding angle comprises:
a first folding angle for redirecting the display light from a first axis running substantially parallel with an eye-ward side of the viewing region to a second axis running substantially perpendicular to the eye-ward side; and
a second folding angle for redirecting the display light at an oblique angle to the eye-ward side of the viewing region such that the user views the display light when looking up above horizontal.

19. The HMD of claim 18, wherein the second folding angle of the partially reflective surface results in the emission path of the display light having a 7 degree±3 degrees downward tilt from horizontal.

20. The HMD of claim 18, wherein the display module includes a display panel mounted to a surface of the eyepiece that is substantially parallel to the eye-ward side of the viewing region out which the display light is emitted and wherein the display panel is rotated about a rotation axis normal to the surface by a complementary angle to pre-compensate for image rotation introduced by the second folding angle.

21. The HMD of claim 18, wherein the display module is rotated by a complementary angle about a rotation axis running down the forward propagation path extending from the display module to the end reflector to pre-compensate for image rotation introduced by the second folding angle.

* * * * *